June 16, 1959  R. W. CAMP  2,891,219
LOW CURRENT RESISTANCE MEASURING DEVICE
Filed April 18, 1956
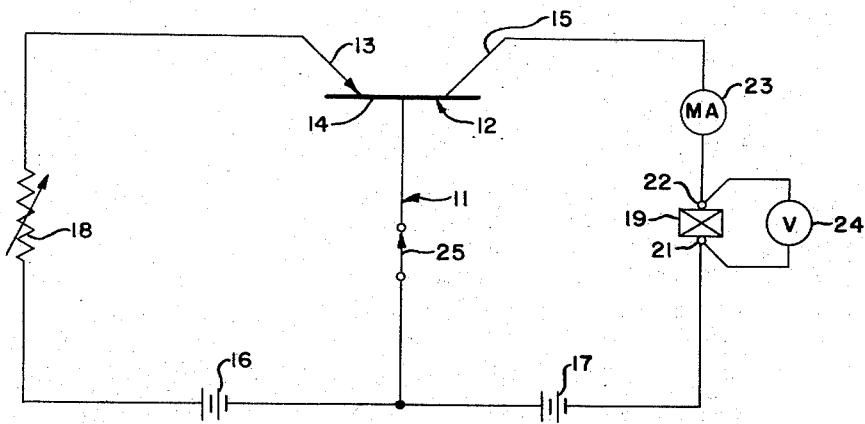
INVENTOR
R. W. CAMP
BY
ATTORNEYS United States Patent Office 2,891,219
Patented June 16, 1959

2,891,219
LOW CURRENT RESISTANCE MEASURING DEVICE

Robert W. Camp, Hollywood, Calif.

Application April 18, 1956, Serial No. 579,119

1 Claim. (Cl. 324—62)

(Granted under Title 35, U.S. Code (1952), sec. 266)

The invention described herein may be manufactured and used by or for the Government of the United States of America for governmental purposes without the payment of any royalties thereon or therefor.

This invention relates generally to electrical measuring devices and more particularly to a low current resistance measuring device for measuring the resistance of powder mixes or compositions.

Although a large number of electrical testing devices for measuring the resistance value of divers elements have heretofore been devised, none of these have proven entirely satisfactory for measuring the resistance of powder mixture specimens, particularly explosive powder mixtures. One limitation of the presently available measuring devices is the magnitude of the current necessary for operation of the devices, which in many instances raises the temperature of the powder mix thereby resulting in erroneous resistance measurements. Oftentimes, in the measurement of the resistance of explosive powder mixtures the magnitude of the operating current is sufficient to heat the mixture to its ignition temperature.

Accordingly, one object of the present invention is to provide a new and improved low current operated resistance measuring device.

Another object of the present invention is to provide a new and improved resistance measuring device employing a transistor.

Still another object of the present invention is the provision of a simple, novel and useful circuit for measuring D.C. resistance.

Other objects and many of the attendant advantages of this invention will be readily appreciated as the same becomes better understood by reference to the following detailed description when considered in connection with the accompanying drawing wherein the single figure is a schematic diagram illustrating the circuit arrangement of the present invention.

Referring to the circuit drawing, there is shown schematically a transistor circuit of the common base configuration, generally indicated by the reference numeral 11. The transistor circuit 11 consists of a p-n-p type transistor 12 having emitter, base, and collector electrodes, respectively indicated by the numerals 13, 14, and 15. Suitable biasing potentials for operation of the transistor are provided by batteries 16 and 17, which for the p-n-p type transistor illustrated are connected to provide a forward direction bias for the emitter 13 and a reverse direction bias for the collector 15. Variable resistor 18 is employed to control the magnitude of the emitter current flow in the transistor 12 and thereby to accurately regulate the magnitude of the collector current which flows through the device, or powder mix specimen, 19 under test interposed between the test terminals 21 and 22.

Test terminals 21 and 22 may be, by way of example and not limitation, probes for insertion into a specimen quantity of a powder mixture, or alligator clips for connection to the lead in wires of a primer cap, or cylinder, containing an explosive powder mixture. Additionally a suitable current indicating device 23, such as a microammeter or milliammeter, is placed in the collector circuit for indicating the magnitude of the collector current. A suitable potential indicating device 24, such as a voltmeter or millivoltmeter, is connected across the terminals 21 and 22 for indicating the magnitude of the potential drop across the test element 19. More accurate results will be realized from the circuit 11 if the milliammeter 23 has a very low internal resistance and voltmeter 24 has a very high input resistance. Switch 25 is provided to start or stop the operation of test circuit 11.

Inasmuch as the collector current of a transistor is inherently limited to a very small value, i.e., a few milliamps, it may be apparent that the current flow through the test element will not heat the specimen under test. Therefore if after closure of switch 25 the magnitude of the current flow and the potential drop are obtained by meters 23 and 24, the resistance of the element 19 may be accurately determined by a consideration of Ohms law.

It is to be understood that although circuit 11 has been illustrated and described as utilizing a p-n-p type transistor, the circuit will also operate satisfactorily if a n-p-n type transistor were used, provided the polarities of the D.C. potential sources 16 and 17 are reversed.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

An electrical apparatus for measuring the resistance of an explosive mixture comprising in combination a transistor having an emitter, a base, and a collector, a first circuit connected between said emitter and base, said first circuit including a variable resistor and a first unidirectional potential source, a second circuit connected between said collector and base including a second unidirectional potential source and test terminals for connection across the explosive mixture, voltage indicating means connected across said terminals, current indicating means connected in said second circuit between said collector and said terminals, said voltage and current indicating means enabling the measurement of the instantaneous resistance of the explosive mixture as the magnitude of current flow in said second circuit is changed by selective manipulation of said variable resistor, and a switch connected to said base of said transistor for simultaneously interrupting said first and second circuits.

References Cited in the file of this patent

UNITED STATES PATENTS 2,779,922    Davidson    Jan. 29, 1957
2,821,681    Baker    Jan. 28, 1958

OTHER REFERENCES

Reed: "CQ" Radio Amateurs Journal, September, 1954, pp. 31–33 and 58–60.

Shea: Principles of Transistor Circuits, John Wiley & Sons Inc., page 25, Figure 2.2.